United States Patent [19]

Leining et al.

[11] 4,433,453
[45] Feb. 28, 1984

[54] SHOULDER SKINNING DEVICE

[75] Inventors: Lyndon R. Leining; Kent L. Simonson, both of Austin, Minn.

[73] Assignee: Geo. A. Hormel & Company, Austin, Minn.

[21] Appl. No.: 370,569

[22] Filed: Apr. 21, 1982

[51] Int. Cl.³ .............................................. A22B 5/16
[52] U.S. Cl. .......................................... 17/21; 99/589
[58] Field of Search ................. 17/50, 21, 62; 99/589, 99/584

[56] References Cited

U.S. PATENT DOCUMENTS 2,914,795 12/1959 Lindstrom et al. ...................... 17/21
4,186,461 2/1980 Leining ..................................... 17/21

Primary Examiner—Willie G. Abercrombie

Attorney, Agent, or Firm—Williamson, Bains, Moore & Hansen

[57] ABSTRACT

A shoulder skinning apparatus includes a skinning device comprised of a housing having a revolvable toothed roller mounted therein and a blade mounted thereon in close proximity to the toothed roller. The skinning device is suspended from a suspension device and power means permits vertical positioning of the skinning device to assure effective removal of the skin from the shoulder area of the hog carcass. The toothed roller and skinning blade are dimensioned whereby when the toothed roller is revolved by power means, the skin from the shoulder area of the hog carcass may be progressively removed in a single pass. A separate control handle controls the positioning and operation of the skinning device by a means of a unique cam arrangement.

8 Claims, 8 Drawing Figures

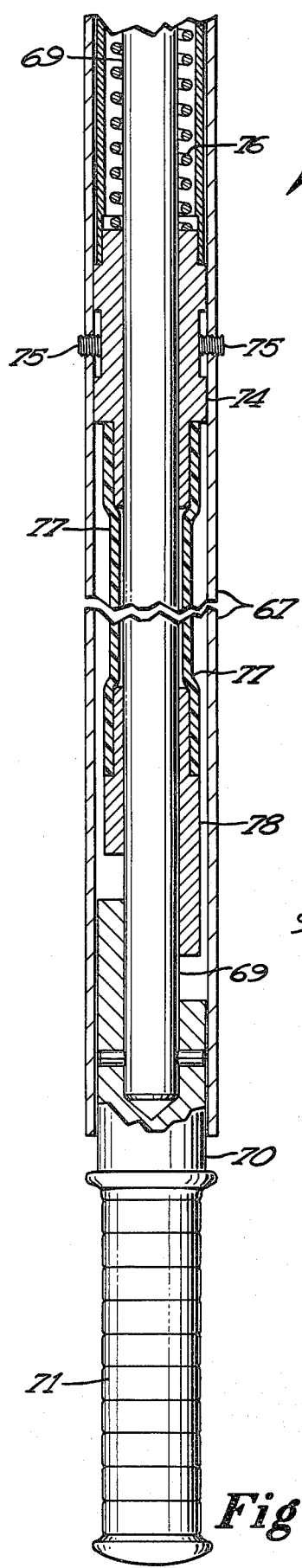
Fig 2
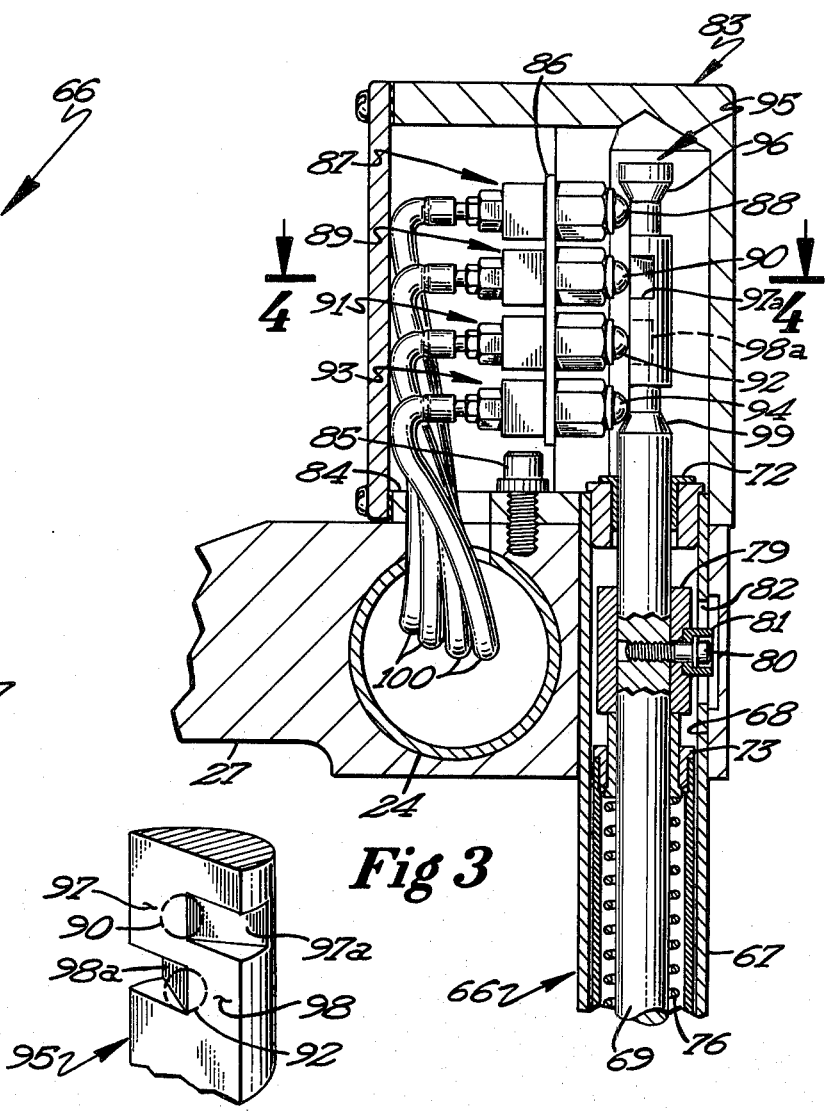
Fig 3
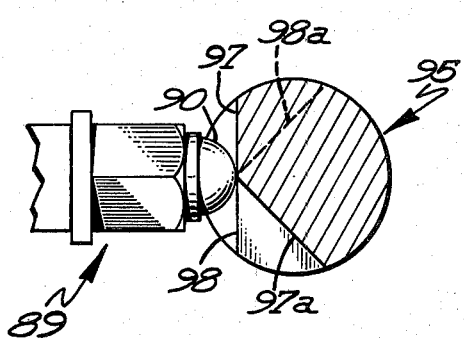
Fig 8
Fig 4

SHOULDER SKINNING DEVICE

SUMMARY OF THE INVENTION

This invention relates to a skinning apparatus, and more particularly to a skinning apparatus for removing skin from the shoulder area of a hog carcass.

Applicants have devised a system for progressively and sequentially removing the skin from the hog carcass shortly after the hog has been slaughtered. The skin is first removed from the hind legs of the carcass in a pulling operation and is next removed from the ham area of the hog carcass by a ham skinning apparatus disclosed in my co-pending application, Ser. No. 259,906, filed May 4, 1981, now U.S. Pat. No. 4,327,633, and entitled "Ham Skinning Apparatus." After the skin is removed from the ham area, the carcasses are moved by an overhead conveyor to a mid-section skinner where the skin is removed from the mid-section portion of the carcass. An apparatus and method for removing the skin from the torso of the hog carcass is disclosed in my co-pending application, Ser. No. 43,041, filed May 29, 1979, now U.S. Pat. No. 4,351,088 and entitled "Method and Apparatus for Removing Skin from Animal Carcasses." The hog carcass, which is suspended with its head down by an overhead conveyor, is then moved to the next station and the skin is removed from the shoulder area of the carcass by an apparatus disclosed in the subject application. The carcass is thereafter moved to the final skinning station where the skin is removed from the head of the carcass.

It is a general object of this invention to provide a shoulder skinning apparatus which is arranged and constructed to effectively and quickly remove the skin from each shoulder area of the hog carcass in a single pass.

A more specific object of this invention is to provide a shoulder skinning apparatus for removing the skin from the shoulder area of a hog carcass in which the apparatus is readily and easily manipulated by a suitable power means to properly position the skinning apparatus for following the irregular contours of the shoulder area during the skinning operation.

These and other objects and advantages of my invention will appear more fully from the following description made in conjunction with the accompanying drawings wherein like reference characters refer to the same or similar parts throughout the several views.

FIGURES OF THE DRAWINGS

FIG. 2 is a cross-sectional view taken approximately along line 2—2 of FIG. 1 and looking in the direction of the arrows.

FIG. 3 is an enlarged fragmentary view of the upper portion of the control handle mechanism illustrating the elements controlling the power means of the apparatus.

FIG. 4 is a cross-sectional view taken approximately along line 4—4 of FIG. 3 and looking in the direction of the arrows.

FIG. 5 is a fragmentary elevational view of a portion of the control handle mechanism.

FIG. 8 is a perspective view of a portion of the control handle mechanism illustrating certain cam surfaces.

DESCRIPTION OF THE PREFERRED EMBODIMENTS

Figure 1:
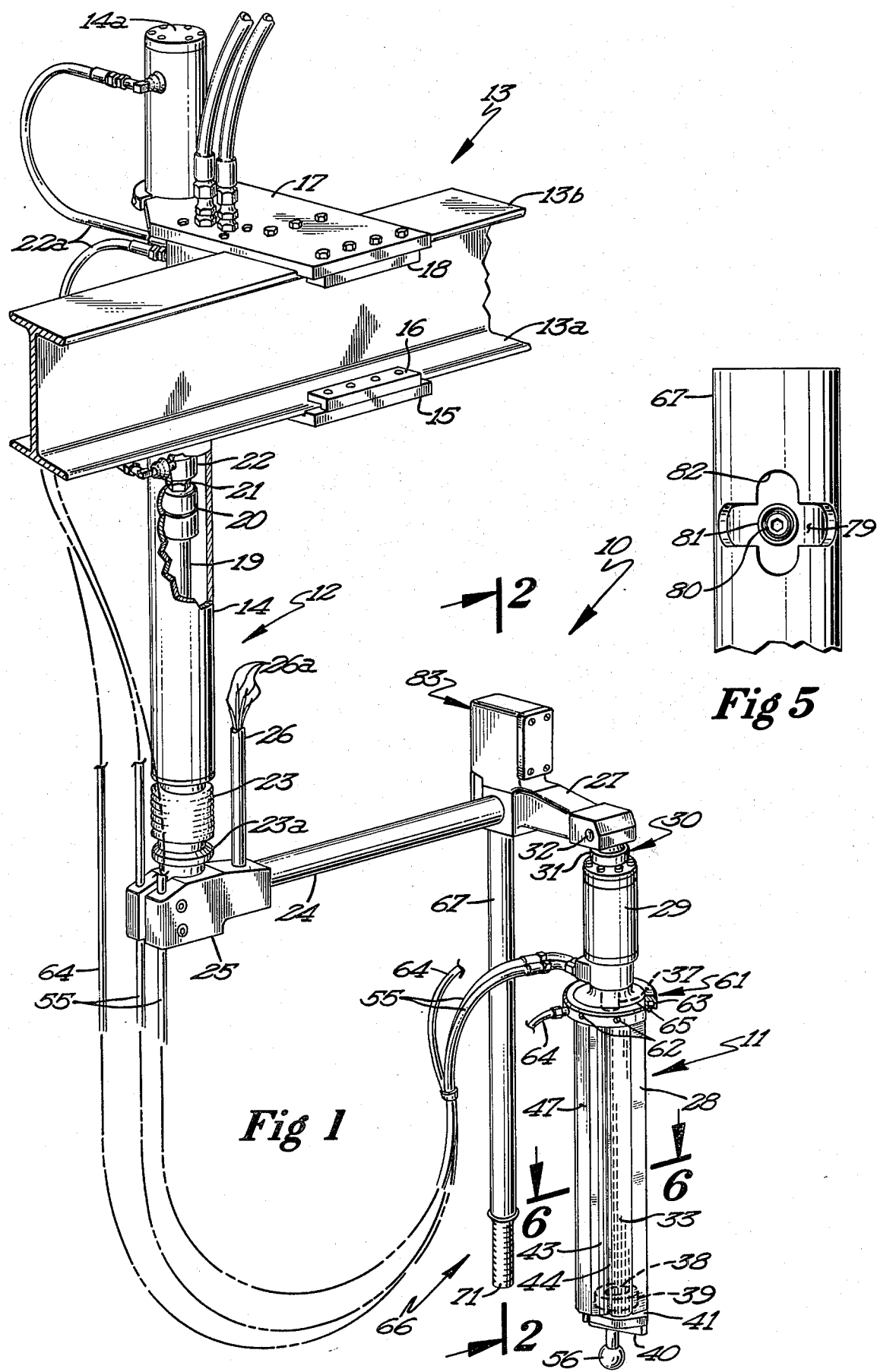
FIG. 1 is a perspective view of the shoulder skinning apparatus.

Referring now to the drawings and more specifically to FIG. 1, it will be seen that one embodiment of the novel shoulder skinning apparatus, designated generally by the reference numeral 10, is thereshown. The shoulder skinning apparatus 10 includes a skinning device 11 which is suspended from an overhead support by a suspension device 12. In the embodiment shown, the overhead support comprises an I-beam 13 which is mounted within the building in which the shoulder skinning apparatus is located. The I-beam 13 also provides a support for an overhead track system (not shown) but which is disclosed in my co-pending application, Ser. No. 259,906, for the ham skinning apparatus. The overhead track system disclosed in my co-pending application directed to the ham skinning apparatus is incorporated by reference herein.

The hog carcasses will be suspended from the overhead track system with their heads positioned downwardly. When the hog carcasses reach the apparatus of the subject application, the skin will have been removed from the hind legs, the ham areas, and the mid-section portion of the carcass by apparatus disclosed in my co-pending applications. The skinning device 11 is operable for removing the skin from each shoulder in a single pass. Thus the skinning device is dimensioned with respect to its overall length to engage the entire length of the shoulder area of the carcass and is cumbersome and heavy and therefore difficult to manipulate.

The suspension device 12, however, permits ready adjustment of the skinning device by an operator even though the skinning device is quite bulky and heavy. The suspension device includes an elongate vertically disposed stationary support 14 which is of cylindrical construction and rigidly affixed to the I-beam 13. In this regard, the suspension device is provided with a lower bracket 15 which is secured to the stationary support 14 and clamped against the lower flange 13a of the I-beam 13 by a clamping plate 16. An upper bracket 17 is clamped against the upper flange 13b of the I-beam 13 by a clamping plate 18. The suspension device 12 also includes a vertically disposed elongate suspension member 19 which is positioned interiorly of the stationary support 14 and is revolvable and vertically translatable relative thereto.

The suspension member 19 is secured at its upper end to a bearing 20 which in turn is secured to the lower end of a piston rod 21, the latter being secured to a piston (not shown) which is movable in a hydraulic cylinder 22. The upper end of the hydraulic cylinder 22 is rigidly affixed to the upper end plate 14a which is rigidly secured to the upper end of the stationary support 14. Suitable conduits 22a are connected in communicating relation to the hydraulic cylinder 22 and are connected to a source of hydraulic fluid under pressure to permit extension and retraction of the piston rod 21 relative to the hydraulic cylinder. It will be seen that when the piston rod 21 is extended, the suspension member 19 will be moved downwardly and when the piston rod 21 is retracted, the suspension member 11 will be moved upwardly. It is also pointed out that the bearing 20 permits the suspension member 19 to revolve about its own longitudinal axis.

The lower end of the stationary support 14 is provided with a flexible yieldable bellows member 23. The lower end of the bellows member is connected to a bearing 23a through which the suspension member 19 projects. The lower end of the suspension member 19 projects into a vertically disposed opening in a clamp 25, the clamp 25 being rigidly secured to the suspension member. A conduit 26 is rigidly affixed to the upper surface of the clamp member 25 and provides a protective covering for a plurality of pneumatic conduits 26a formed of urethane tubing. It will be seen that the clamp 25 is integral with one end of an elongate rigid horizontal member 24 which is provided with a horizontal arm 27 affixed to the outer end thereof. It will be seen that the horizontal arm 27 is disposed at substantially right angles to the longitudinal axis of the arm 24 and provides means for suspending the skinning device 11 therefrom.

The skinning device 11 includes a vertically disposed housing 28 which has a reversible rotary motor 29 mounted on its upper end. A bearing 30 is mounted on the upper end of the hydraulic motor 29 and includes a bearing housing 31. The bearing housing 31 is pivotally connected to the arm 27 by a pivot 32 to permit swinging movement of the skinning device about a substantially horizontal axis disposed substantially parallel to the horizontal member 24. It is also pointed out that the bearing 30 permits the entire skinning device to rotate about its general longitudinal axis.

The skinning device 11 is provided with an elongate, generally vertically disposed toothed roller 33 which is positioned within the housing 28 and extends substantially throughout the vertical or axial dimension thereof. The toothed roller 33 is provided with a plurality of teeth 34 which are arranged in vertically or axially spaced-apart rows 35. Annular grooves or spaces 36 are defined between adjacent rows 35 of the teeth 34.

The toothed roller is provided with an upper stub shaft 37 which is drivingly connected to the output shaft of the hydraulic motor 29. The toothed roller is also provided with a lower stub shaft 38 which is positioned in a bearing 39 mounted on the lower wall 40 of the housing 28. It will be seen that when the hydraulic motor 29 is energized, the toothed roller will be revolved.

Figure 6:
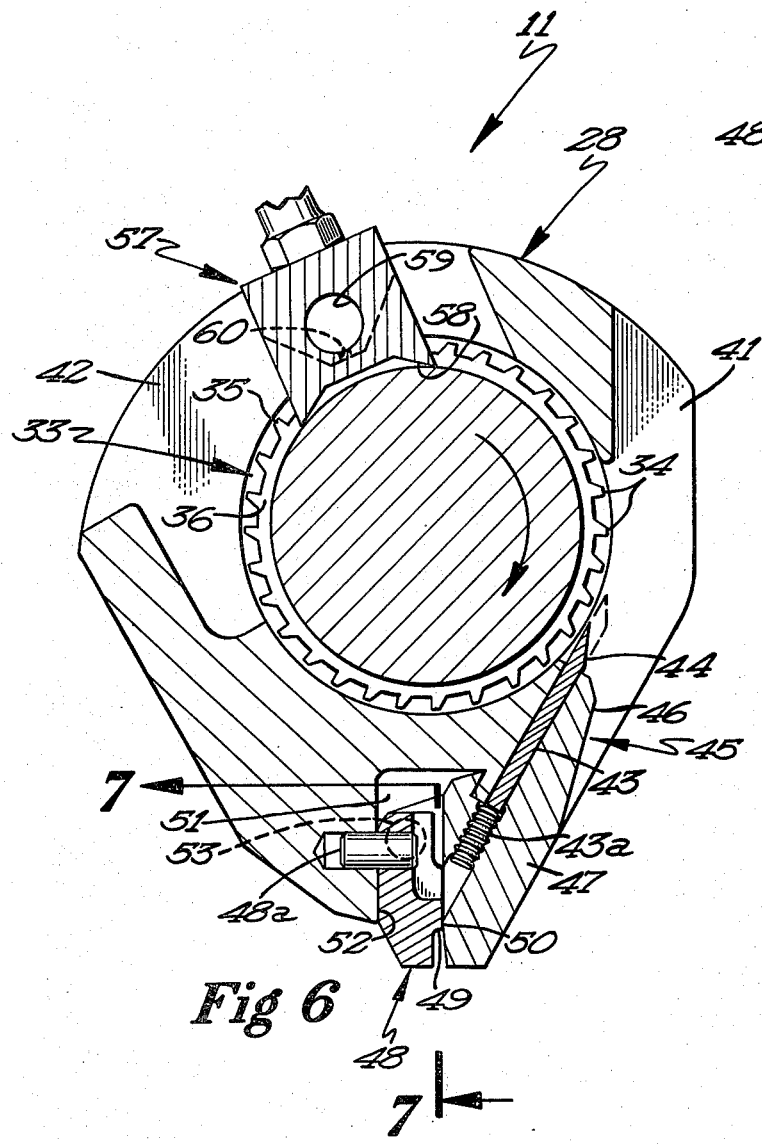
FIG. 6 is a cross-sectional view taken approximately along line 6—6 of FIG. 1 and looking in the direction of the arrows.
Figure 7:
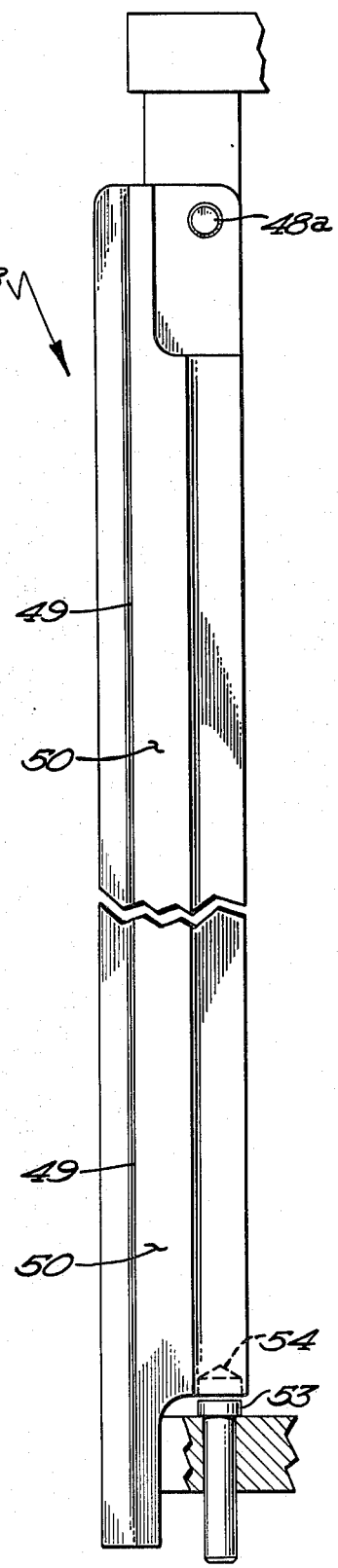
FIG. 7 is a cross-sectional view taken approximately along line 7—7 of FIG. 6 and looking in the direction of the arrows.

Referring now to FIG. 6, it will be seen that the toothed roller 33 is positioned in the housing 28 so that the exterior surface of the toothed roller is disposed closely adjacent the inner surface of the housing. The housing 28 is provided with an infeed opening 41 which is located adjacent one side thereof and is provided with an outlet 42 spaced from the infeed opening. A skinning blade 43 is mounted on the housing 28 adjacent the infeed opening 41 and the skinning blade 43 is provided with a cutting edge 44. The skinning blade 43 is adjustable by set screws 43a to shift the cutting edge 44 relative to the toothed roller. Referring now to FIG. 6, the position of the cutting edge 44 illustrated in dotted line configuration makes a deeper cut than when the blade is in the position illustrated in full line configuration. The skinning blade 43 is retained in mounted relation on the housing 28 by an elongate blade retainer 45 which is of angular configuration, as best seen in FIG. 6. The blade retainer includes a blade-engaging portion 46 which projects outwardly from the body 47 of the retainer.

Means are provided for causing the blade retainer 45 to be urged into clamping relation with the skinning blade 43 and this means includes an elongate wedge member 48 which is provided with an offset portion 49 having a planar surface 50 which is tapered at an angle of approximately 4° as best seen in FIG. 6. The wedge member 48 is positioned in a recess 51 in the housing and engages a surface 52 of the housing and also engages the body of the elongate blade retainer. A locking pin 53 on the lower end of the wedge member 48 engages in a locking opening 54 in the housing and urges the blade retainer in a clamping relation with the skinning blade 43 to releasably lock the blade in clamped relation on the housing.

Referring again to FIG. 6, it will be seen that the toothed roller 33 is rotated in a clockwise direction during the skinning operation so that the skin of the shoulder area is pulled against the blade 43 and will be progressively removed from the shoulder area. The skin is discharged through the outlet 42 of housing 28 after it has been removed from the shoulder area. The hydraulic motor 29 is provided with a pair of conduits 55 which in turn are connected to a source of hydraulic fluid under pressure. It will also be seen that the housing 28 is provided with a hand-grip knob 56 which is secured to the lower wall 40 of the housing and projects downwardly therefrom and serves to facilitate manipulation of the skinning device during the skinning operation.

The skinning device 11 is also provided with an elongate, generally vertically disposed, rectangular shaped stripper bar 57 which is mounted on the housing 28 and which is positioned in the outlet 42 of the housing. The stripper bar 57 is provided with a plurality of similar, vertically spaced-apart generally rectangular shaped lateral stripper elements 58 which are integral therewith and which project laterally at right angles therefrom. Each of the stripper elements 58 projects into one of the grooves or spaces 36 between adjacent rows of teeth. Referring again to FIG. 6, it will be seen that the inner edge of these stripper elements are disposed in tangential relation with respect to the toothed roller and serve to strip the skin from the roller during the skinning operation. It is pointed out that the stripper bar 57, the elongate blade retainer 45, and the wedge member 48 are generally similar to the corresponding elements of the ham skinning apparatus disclosed in my copending application, Ser. No. 259,906. To this end, the stripper bar 57 is removably mounted on the housing in the same manner as the stripper bar in the ham skinning apparatus. Although not shown in the drawing, the lower portion of the housing is provided with a lateral projection which defines the slot in which the lower end of the stripper bar is positioned. The upper end of the stripper bar is retained in place by a latch element which is slidable between a stop member and the housing in the manner of the ham skinning apparatus. These particular features are not shown in the instant drawing but are incorporated by reference with respect to the disclosure in the ham skinning apparatus, Ser. No. 259,906.

Means are also provided for cleaning the stripper bar and the toothed roller during the operation of the skinning device. Referring again to FIG. 6, it will be seen that the stripper bar 57 has an elongate cylindrical chamber or bore 59 therethrough which communicates with a plurality of outlet ports 60, each being located between an adjacent stripper element. The chamber 59 is connected by a suitable conduit to a source of water under pressure so that water is supplied through the ports 60 to constantly remove hair and other material from the stripper bar and the toothed roller during operation of the skinning device.

The skinning device 11 is also provided with a spray ring 61 which is of annular construction and which is secured to the housing at the upper end thereof by clamping bolts 62. It will be seen that the clamping bolts threadedly engage threaded apertures in the spray ring and clamp against the housing to mount the spray ring thereon. The spray ring 61 is provided with an annular central chamber 63, and an inlet conduit 64 is connected to the spray ring and communicates with the central chamber and to a source of hot water under pressure.

The spray ring 61 is also provided with a plurality of outlet ports 65 in the lower wall thereof which are arranged circumferentially to discharge water downwardly and inwardly against the toothed roller. In the embodiment shown, the outlet ports 65 are angled inwardly from the vertical at an angle of approximately 10° and are circumferentially spaced apart approximately 10° throughout the periphery of the lower wall of the spray ring. It will therefore be seen that when water under pressure is supplied to the spray ring, water will be discharged through the ports, against the toothed roller and outside of the skinning device.

Referring now to FIG. 2, it will be seen that the shoulder skinning apparatus 10 is provided with an elongate control handle mechanism 66 which is secured to the horizontal arm 27 and is spaced from the skinning device 11. The control handle mechanism 66 includes an elongate vertically disposed outer tubular member 67 which has its upper end projecting into a vertically disposed opening in one end portion of the horizontal arm 27. In this regard, it will be noted that the control handle mechanism depends from one end portion of the arm 27 while the skinning device 11 depends from the other end portion thereof. The outer tubular member is affixed to the horizontal arm 27 and depends therefrom and an elongate cylindrical inner movable member 69 is positioned interiorly of the outer tubular member and is revolvable and vertically shiftable relative thereto. The inner movable member 69 has a handle element 70 secured to the lower end thereof and projects downwardly therefrom and a tubular hand grip 71 is positioned around the lower end of the handle element 70.

Referring again to FIG. 3, it will be seen that a bearing 72 and a bearing 73 are interposed between the outer tubular member 67 and the inner movable member 69. The bearings are vertically spaced apart adjacent the upper end portion of the outer tubular member. A rigid metallic sleeve element 74 is positioned interiorly of the outer tubular member 67 and is secured thereto by a screw 75. A spring 76 is positioned around the inner movable member and interiorly of the outer tubular member, and is interposed between the sleeve element 74 and the bearing 73. It will therefore be seen that when the inner movable member is moved downwardly relative to the outer tubular member, this downward movement will be yieldably resisted by the spring 76.

Means are also provided for yieldably resisting rotational movement of the inner movable member relative to the outer tubular member. This means includes an elongate, flexible resilient tubular element 77 which is formed of urethane and which is positioned around the inner movable member interiorly of the outer tubular member. It will be seen that the upper end portion of the urethane tubing element 77 is affixed to the sleeve element 74, and that the lower end portion of the tubular element is secured to a rigid sleeve element 78 which is secured to the inner movable member 69 adjacent the lower end portion thereof. It will therefore be seen that when the inner movable member is rotated relative to the outer tubular member, this rotational movement will cause the tubing element to twist and produce a resistant torque force which will return the inner tubular member to its non-rotative neutral position when the handle element is released.

Means are provided for limiting vertical and rotational movement of the inner movable member relative to the outer tubular member. This means includes a sleeve element 79 which is secured to the inner movable member 69 by a bolt 80 which is provided with an enlarged head 81. The outer tubular member 67 has an opening 80 therein adjacent the upper end thereof through which the head 81 of the bolt 80 projects. Referring now to FIG. 5, it will be seen that the opening 82 is in the form of a cross-slot in which the bolt head 81 moves. Therefore rotational movement of the inner movable member is limited by the horizontal portion of the cross-slot and vertical movement of the inner movable member is limited by the vertical portion of the slot.

Referring now to FIGS. 3 and 4, it will be seen that the inner movable member projects upwardly beyond the outer tubular member and into a generally rectangular shaped housing 83 which is mounted on the upper surface of the horizontal arm 27. The housing 83 is secured to the horizontal arm 27 by a bolt 85 which projects through the lower wall 84 of the housing 83. The housing 83 has a vertically disposed bracket 86 mounted therein which supports a plurality of vertically arranged pneumatic control valves. In this regard, bracket 86 supports a pneumatic control valve 87 having an actuator button 88, a pneumatic control valve 89 having an actuator button 90, a pneumatic control valve 91 having an actuator button 92, and a pneumatic control valve 93 having an actuator button 94. The pneumatic control valves 87 and 93 control a hydraulic valve (not shown) which causes extension and retraction of the piston rod 21 for the hydraulic cylinder 22. The pneumatic control valves 89 and 91 control a hydraulic valve (not shown) which controls the direction of rotation of the hydraulic motor 29 for the skinning device 11.

Means are provided for selectively operating the pneumatic control valves and this means includes a cam structure 95 which constitutes the upper end portion of the inner movable member 69. The cam structure 95 has vertically arranged cam surfaces 96, 97, 98 and 99. The uppermost cam surface 96 is of frusto conical configuration and is disposed adjacent the actuator button 88 of the pneumatic control valve 87. The next adjacent cam surface 97 is located adjacent the actuator button 90 of the pneumatic control valve 89. The cam surface 98 is located adjacent the actuator button 92 of the pneumatic control valve 91. The cam surface 99 is of frusto conical configuration and is located adjacent the actuator button 94 of the pneumatic actuator valve 93. Referring to FIGS. 4 and 8, it will be seen that cam surfaces 97 and 98 are disposed in the same plane but are laterally and vertically spaced apart. These cam surfaces are formed by removing material and it will be seen that cam surface 97 has an angular recessed surface 97a adjacent thereto. Similarly cam surface 98 has an angular recessed surface 98a adjacent thereto. Cams 97 and 98 are operated by rotation of the cam structure 95 and cams 96 and 99 are operated by vertical translation of the cam structure.

It will therefore be seen that when the inner movable member 69 is rotated in one direction, cam surface 97 will actuate the pneumatic valve 89 to operate the hydraulic motor for rotation in one direction to perform the skinning operation. Similarly, when the inner movable member is rotated in the opposite direction, the cam surface 98 will actuate the pneumatic control valve 91 to cause the hydraulic motor 29 to revolve in the opposite direction to permit cleaning of the toothed roller. When the inner movable member is moved downwardly, the cam surface 96 will actuate the pneumatic control valve 87 to extend the piston rod 21 of the hydraulic cylinder 22 to shift the suspension member 19 and the skinning device downwardly. Similarly, when the inner movable member 69 is shifted upwardly, the cam surface 99 will actuate the pneumatic control valve 93 to raise the skinning device 11.

During operation of the shoulder skinning apparatus, the hog carcass will be suspended, head downwardly, from an overhead track system and the skin will have been removed from the ham and mid-section areas of the carcasses. The operator will grip the handle knob 56 on the skinning device and will grip the hand grip 71 of the control handle mechanism to properly position the skinning device 11 with respect to the shoulder area of the carcass. The operator will determine if the skinning device 11 must be raised or lowered and will accomplish this by merely shifting the handle element 70 vertically upwardly or downwardly. The skinning device 11 may be tilted by the operator by shifting the handle 56.

When the skinning device 11 is properly positioned with respect to the shoulder area of the hog carcass, the operator will rotate handle element 70 in a direction to energize the motor 29 to operate the toothed roller in a skinning mode. The toothed roller will grip and pull the skin of the shoulder area of the hog carcass against the skinning blade and the skin will be removed from the toothed roller and the housing 28 by the stripper bar 57. The skin will be removed from each shoulder area of the hog carcass by a single pass of the skinning device 11. When the skin has been removed from the shoulder area of a hog carcass, the operator will rotate the handle element 70 in the opposite direction to reverse the operation of the motor 29 and the toothed roller 33, and will then operate the valve that permits water to be sprayed through the outlet ports 60 of the stripper bar 57 and through the outlets in the spray ring 61. This spray cycle will clean the toothed roller and knife, and the operator will then release the handle element 70 to permit the inner movable member to return to its neutral position by the tubular urethane element 77.

It will be seen that the control handle mechanism and the suspension device permits the skinning device to be readily vertically adjusted with a minimum of effort by the operator. Skin can be removed from the shoulder area of a hog carcass in a single pass and the apparatus can be readily cleaned by merely reversing the toothed roller while subjecting the same to a cleaning water spray.

From the foregoing, it will be seen that we have provided a novel shoulder skinning apparatus which is operable to remove the skin from the shoulder area of a hog in a single pass and in a manner which is much more efficient than any comparable skinning device.

While the preferred embodiments of the present invention have been described, it should be understood that various changes, adaptions, and modifications may be made therein without departing from the spirit of the invention and the scope of the appended claims.

What is claimed is:

1. A skinning apparatus for removing skin from the shoulder area of a hog carcass, comprising:

a skinning device including a generally vertically oriented housing having a hollow interior, an elongate vertically oriented toothed roller revolvably mounted therein said housing for revolving movement relative thereto, an elongate generally vertically oriented skinning blade having a cutting edge, means mounting said blade on said housing to position the cutting edge of the blade closely adjacent the toothed roller, said blade and toothed roller each having a length dimension corresponding generally to the length dimension of the shoulder area of a hog whereby said toothed roller will grip the skin of the hog carcass and pull the same against the cutting edge of the blade to remove the skin from the shoulder of the hog carcass in a single pass, power means secured to said housing at the upper end thereof and being operable for selectively revolving said toothed roller in a clockwise and counter-clockwise direction, a suspension device including a stationary support, an elongate vertically disposed suspension member, second power means connected with said stationary support, means connecting said second power means with the upper end of said suspension member to permit rotation of the suspension member about its longitudinal axis and vertical translation of the suspension member relative to said support, an elongate horizontal member secured to said suspension member at the lower end thereof and being movable therewith, means interconnecting said horizontal member with said first-mentioned power means to permit angular tilting of the skinning device housing about a horizontal axis and rotation of the housing about its longitudinal axis, and an elongate vertically disposed control handle mechanism secured to said horizontal member and depending therefrom and being spaced from said housing, said control handle mechanism including elongate fixed and movable members, said movable member being vertically shiftable to actuate said second-mentioned power means and being revolvable in either direction to actuate said first-mentioned power means.

2. The skinning apparatus as defined in claim 1 and an annular spraying device mounted on the upper end portion of the skinning device housing and being connected to a source of water, valve means disposed in flow-controlling relation with said spray device to selectively permit water to be sprayed upon the toothed roller and skinning blade at the end of the skinning cycle to clean the same.

3. The skinning apparatus as defined in claim 1 wherein said movable member of said control handle mechanism is provided with a cam structure at its upper end, a plurality of control valves mounted adjacent said cam structure and controlling operation of said first and second-mentioned power means, certain of such valves being actuated when said movable member of the handle mechanism is shifted vertically and other of said valves being actuated in response to rotation of said movable member of the control handle mechanism.

4. The skinning apparatus as defined in claim 1 wherein said fixed member of said control handle mechanism is of tubular construction, said movable member being disposed within said fixed member and projecting outwardly beyond opposite ends thereof.

5. The skinning apparatus as defined in claim 4 and yieldably engaging said movable member for resisting vertical movement of the latter.

6. The skinning apparatus as defined in claim 5 and second yieldable means engaging said fixed and movable members and yieldably resisting rotational movement of said movable member relative to said fixed member in either direction.

7. The skinning apparatus as defined in claim 6 wherein said second yieldable means includes an elongate tubular element formed of resilient, flexible material.

8. The skinning apparatus as defined in claim 1 wherein said control handle mechanism corresponds in length to the general overall length of said skinning device.

* * * * *